Patented June 18, 1929.

1,718,103

UNITED STATES PATENT OFFICE.

WILLIAM CHARLES BAXTER, OF BERKELEY, CALIFORNIA.

PROCESS OF EXTRACTING MERCURY FROM CINNABAR.

No Drawing.   Application filed April 13, 1926. Serial No. 101,814.

My invention relates to a new and useful method of extracting mercury from ore.

One object of my invention is to provide a new and useful process of economically recovering mercury from the cinnabar or sulphide ores, the process being characterized by a great saving in labor and manufacturing costs as well as in greater efficiency.

Another object of my invention is to provide a method of recovering mercury from its ores which will preclude the possibility of mercury vapor escaping into the air, thereby protecting the health of the operators and at the same time preventing losses of the mercury.

A further object of my invention is to provide a process by which mercury can be recovered from its ores by electrolysis, thereby making it possible to use lower grades of ore than has previously been feasible. Other objects will be apparent from a consideration of the specification and claims.

At the present time, mercury is commercially recovered from cinnabar by one of two methods. The first process is characterized by the roasting of the ore at a high temperature in the presence of the oxygen of the air until the sulphur of the mercuric sulphide has formed sulphur dioxide and mercury has been liberated in the form of a vapor. The second method consists in roasting the cinnabar (mercuric sulphide) with lime whereupon calcium sulphide and calcium sulphate are formed and the mercury is set free.

In both these processes, the mercury vapor must be recovered by condensation. Since mercury is liberated in the form of a fine fog, difficulties are encountered in the condensation process and material losses result. The hazard to the health of the workmen is another disadvantage for mercury vapor being poisonous causes occupational diseases which constantly menace the operators in the vicinity of the kilns and the recovering system. The high cost of installation and operation, and the fact that only relatively rich ores can be successfully treated, are further disadvantages.

I have invented a process whereby mercury can be successfully extracted from mercuric sulphide by electrolysis. My process is characterized by dissolving finely crushed ore in a solution of an alkali metal sulphide and an alkali metal hydroxide, and then passing a current of electricity through this solution. Upon the passage of the electricity through the electrolyte, mercury in a relatively pure condition will be precipitated. The process may be successfully carried out either by employing direct or alternating current electricity.

The solution of the alkali sulphide and alkali hydroxide can be used over again with very small additions of the compounds to make up the losses. Since the material cost of the solution will be nearly negligible in subsequent runs and a practically complete recovery of the mercury from the cinnabar will be insured, a cheap, efficient and effective method of extracting mercury from its ores is provided by my process. There is no liberation of hydrogen sulphide, sulphur dioxide or other gas by my process, so an open electrolytic cell may be used.

The concentration of the alkali compounds in the solution and the pulp ratio of ore to the solution may vary widely. The cinnabar ore to be dissolved in the solution should be in a relatively finely divided condition, such as powder that will pass a forty mesh screen, but this detail is one of mere manipulation and is within the skill of the operator. I prefer to use sodium sulphide as the alkali metal sulphide and sodium hydroxide as the alkali metal hydroxide because of the cheapness of these compounds. However, other equivalent substances may be used such as, for example, the compounds of potassium.

I have found that the use of the process in the following manner has given especially satisfactory results, but while I am giving the details as a preferred example, I do not wish these proportions to be interpreted as limiting my invention in any way.

The solution of the alkali metal compounds to which the crushed ore is added is a 2% solution of sodium sulphide and a .75% solution of sodium hydroxide in water. One part crushed cinnabar ore which has passed a forty mesh screen is added to every three parts of the prepared solution. The ore is allowed to dissolve which requires two hours or more, the solution is then filtered and placed in a suitable container through which a current of electricity is passed. This container may be of any type desired and its choice depends upon the conditions existing in the particular plant. For example, an ordinary cell having two electrodes has proved satisfactory. The electrodes may be any of those commonly used which are insoluble in the electrolyte. Platinum electrodes have proved to be satisfactory for use with both alternating and direct current. With alternating current, mercury is precipitated from both electrodes alternately as they become negative. In this case, the mercury collects as a grey precipitate and may be recovered by straining through a chamois. With direct current, the mercury collects on the negative electrode and from there falls to the bottom of the cell, as liquid mercury, from which it may be easily withdrawn. While I have mentioned platinum electrodes, other cheaper materials which are insoluble in the electrolyte may be advantageously used. By my process, I have obtained nearly 100% extraction of the mercury, the mercury being approximately 99% pure.

Considerable modification in the proportions used and in the methods of carrying out the electrolysis are possible with no departure from the essential features of my invention.

I claim:

1. The process of extracting mercury from cinnabar which comprises dissolving the ore in a solution of an alkali metal sulphide and an alkali metal hydroxide, passing a current of electricity through the solution to precipitate the mercury, and separating the mercury from the solution.

2. The process of extracting mercury from cinnabar which comprises dissolving the ore in a solution of sodium sulphide and sodium hydroxide, passing a current of electricity through the solution to precipitate the mercury, and separating the mercury from the solution.

3. The process of extracting mercury from cinnabar which comprises dissolving one part of ore in three parts of a solution of an alkali metal sulphide and an alkali metal hydroxide, passing a current of electricity through the solution to precipitate the mercury, and separating the mercury from the solution.

4. The process of extracting mercury from cinnabar which comprises dissolving one part of ore in three parts of a 2% solution of an alkali metal sulphide and a .75% solution of an alkali metal hydroxide, passing a current of electricity through the solution to precipitate the mercury, and thereafter separating the mercury from the solution.

5. The process of extracting mercury from cinnabar which comprises treating one part of crushed ore which will pass through a forty mesh sieve with a 2% solution of an alkali metal sulphide and .75% solution of an alkali metal hydroxide until the ore has dissolved, filtering the solution, passing a current of electricity through the solution to precipitate the mercury, and thereafter separating the mercury from the solution.

WILLIAM CHARLES BAXTER.